(12) United States Patent
Dondoneau et al.

(10) Patent No.: US 12,150,061 B2
(45) Date of Patent: *Nov. 19, 2024

(54) AVIATION CONNECTIVITY GATEWAY MODULE FOR REMOTE DATA OFFLOAD

(71) Applicant: Cirrus Design Corporation, Duluth, MN (US)

(72) Inventors: Matt Dondoneau, Horace, ND (US); Johan Wiig, Billancourt (FR); Ross Eickhoff, Fargo, ND (US); Andy Stromme, Billings, MT (US); Justin Koob, Harwood, ND (US); Bradley T. Cyr, Duluth, MN (US); Austin Matthew Murch, Esko, MN (US); David Andrew Rathbun, Hermantown, MN (US)

(73) Assignee: Cirrus Design Corporation

( * ) Notice: Subject to any disclaimer, the term of this patent is extended or adjusted under 35 U.S.C. 154(b) by 0 days.

This patent is subject to a terminal disclaimer.

(21) Appl. No.: 18/134,975

(22) Filed: Apr. 14, 2023

(65) Prior Publication Data
US 2023/0254772 A1    Aug. 10, 2023

Related U.S. Application Data

(63) Continuation of application No. 17/104,500, filed on Nov. 25, 2020, now Pat. No. 11,659,490.

(Continued)

(51) Int. Cl.
*H04W 52/02* (2009.01)
*H04W 4/14* (2009.01)
(Continued)

(52) U.S. Cl.
CPC ......... *H04W 52/0235* (2013.01); *H04W 4/14* (2013.01); *H04W 4/38* (2018.02);
(Continued)

(58) Field of Classification Search
CPC ............ B64U 2201/20; B60C 23/0474; B60C 2200/02; H04W 52/0235; H04W 4/38;
(Continued)

(56) References Cited

U.S. PATENT DOCUMENTS 6,181,990 B1    1/2001    Grabowsky et al.
6,577,419 B1 *  6/2003    Hall ....................... H04B 10/40
                                                         398/115

(Continued)

FOREIGN PATENT DOCUMENTS

CN    105373115 A        3/2016
EP       2020764 A2 *   2/2009    ........... F41G 7/2206
(Continued)

OTHER PUBLICATIONS

AirSync, "AirSync Kit—Gen 2—with 1 year Entry Tier Service", Product Description Sheet, https://air-sync.com/products/airsync, (2020), 2 pp.

(Continued)

*Primary Examiner* — Dung Hong
(74) *Attorney, Agent, or Firm* — FAEGRE DRINKER BIDDLE & REATH

(57) ABSTRACT

An aviation connectivity gateway module for remote access to an aircraft's systems and remotely offloading its aircraft data. The module broadly comprises a CPU, a first set of communication elements, a second set of communication elements, a memory, a battery, an IMU, a GPS module, and a number of antennas. The module responds to remote prompts and offloads aircraft data when the aircraft is powered off. An aviation connectivity gateway module for complete BVLOS cellular network connectivity broadly comprises a CPU, a set of electronic connectors, a memory, an IMU, a GPS module, a first cellular connectivity element, a second cellular connectivity element, and a number of (Continued)

antennas. The module switches between the first cellular communication element and the second communication element based a status of the aircraft.

19 Claims, 8 Drawing Sheets

Related U.S. Application Data

(60) Provisional application No. 62/941,443, filed on Nov. 27, 2019.

(51) Int. Cl.
| | |
|---|---|
| *H04W 4/38* | (2018.01) |
| *H04W 4/42* | (2018.01) |
| *H04W 36/26* | (2009.01) |
| *H04W 36/32* | (2009.01) |
| *H04W 76/15* | (2018.01) |
| *H04W 76/22* | (2018.01) |
| *H04W 88/16* | (2009.01) |

(52) U.S. Cl.
CPC .............. *H04W 4/42* (2018.02); *H04W 36/26* (2013.01); *H04W 36/32* (2013.01); *H04W 76/15* (2018.02); *H04W 76/22* (2018.02); *H04W 88/16* (2013.01)

(58) Field of Classification Search
CPC ....... H04W 4/42; H04W 76/15; H04W 76/22; H04W 4/14; H04W 36/26; H04W 36/32; H04W 88/16
See application file for complete search history.

(56) References Cited

U.S. PATENT DOCUMENTS

| | | | |
|---|---|---|---|
| 6,876,905 | B2 | 4/2005 | Farley et al. |
| 7,187,927 | B1 | 3/2007 | Mitchell |
| 7,436,322 | B2 | 10/2008 | Crank |
| 8,391,788 | B1 | 3/2013 | Mazuk et al. |
| 8,493,906 | B1* | 7/2013 | Troxel ............... H04B 7/18506 370/316 |
| 9,191,053 | B2 | 11/2015 | Ziarno et al. |
| 9,202,318 | B2 | 12/2015 | Batcheller et al. |
| 9,327,600 | B1 | 5/2016 | Nehmeh |
| 10,084,529 | B1 | 9/2018 | Riechers et al. |
| 10,362,035 | B1 | 7/2019 | Corbett |
| 11,659,490 | B2* | 5/2023 | Dondoneau ........... H04W 76/22 455/420 |
| 11,762,383 | B2 | 9/2023 | Murch et al. |
| 2006/0030311 | A1 | 2/2006 | Cruz et al. |
| 2006/0040660 | A1 | 2/2006 | Cruz et al. |
| 2006/0217851 | A1 | 9/2006 | McGuffin et al. |
| 2007/0179689 | A1 | 8/2007 | Soulie et al. |
| 2007/0228214 | A1 | 10/2007 | Horak |
| 2007/0246610 | A1 | 10/2007 | Rath et al. |
| 2008/0119968 | A1* | 5/2008 | Loda .................... H04L 67/025 701/3 |
| 2010/0256841 | A1 | 10/2010 | Garrec et al. |
| 2010/0273450 | A1* | 10/2010 | Papineau ................ H04L 51/58 455/411 |
| 2011/0313614 | A1 | 12/2011 | Hinnant, Jr. et al. |
| 2012/0029853 | A1 | 2/2012 | Baumheinrich et al. |
| 2015/0177737 | A1 | 6/2015 | Jensen et al. |
| 2015/0234387 | A1 | 8/2015 | Mullan et al. |
| 2016/0119052 | A1 | 4/2016 | Frerking et al. |
| 2016/0205724 | A1 | 7/2016 | Shi |
| 2017/0043249 | A1 | 2/2017 | Bartlett et al. |
| 2017/0045884 | A1 | 2/2017 | Kablaoui |
| 2018/0170575 | A1 | 6/2018 | Ziarno |
| 2018/0205658 | A1* | 7/2018 | Sullivan ................. H04L 67/12 |
| 2018/0352512 | A1 | 12/2018 | Kim et al. |
| 2020/0028687 | A1 | 1/2020 | Castet et al. |
| 2020/0044692 | A1 | 2/2020 | Sheffield |
| 2021/0160755 | A1 | 5/2021 | Dondoneau et al. |
| 2021/0160781 | A1 | 5/2021 | Dondoneau et al. |
| 2021/0333792 | A1 | 10/2021 | Murch et al. |
| 2022/0404824 | A1 | 12/2022 | Murch et al. |
| 2023/0384785 | A1 | 11/2023 | Murch et al. |

FOREIGN PATENT DOCUMENTS

| | | |
|---|---|---|
| WO | 2021/108571 A1 | 6/2021 |
| WO | 2021/108577 A1 | 6/2021 |

OTHER PUBLICATIONS

Appareo Gateways Overview, "Rugged Edge Computers For Mobile Equipment", Product Overview Sheet, www.appareo.com, 2 pp.
Appareo iot Gateway 270/370 Data Sheet, "Advanced Communication Edge Computer Model 608065-0000XX", Product Data Sheet, www.appareo.com/iot, (2019) 5 pp.
Appareo iot Gateway 300 Data Sheet, "Advanced communication computing platform for mobile equipment applications", Product Data Sheet, www.appareo.com, (2016-2017) 6 pp.
Avionica avRDC Remote Data Concentrator, Product Description Sheet, https://avionica.com/avrdc, 5 pp.
Bad Elf, "Bad Elf Wombat", Product Description Page, https://badelf.com/pages/wombat-piston, (2020) 7 pp.
European Search Report for EP Patent Application No. 21796772.8, Issued on Apr. 12, 2024, 10 pages.
Garmin, GDU 104X Installation Manual, Garmin Ltd., Jul. 2010, 70 pp.
International Preliminary Report on Patentability received for PCT Patent Application No. PCT/US20/62254, mailed on Jun. 9, 2022, 8 pages.
International Preliminary Report on Patentability received for PCT Patent Application No. PCT/US20/62260, mailed on Jun. 9, 2022, 12 pages.
International Search Report and Written Opinion received for PCT Patent Application No. PCT/US20/62254, mailed on Feb. 9, 2021, 8 pages.
International Search Report and Written Opinion received for PCT Patent Application No. PCT/US20/62260, mailed on Feb. 12, 2021, 12 pages.
International Search Report and Written Opinion received for PCT Patent Application No. PCT/US2020/062254, mailed on Feb. 9, 2021, 8 pages.
International Search Report and Written Opinion received for PCT Patent Application No. PCT/US2021/029309, mailed on Aug. 5, 2021, 12 pages.
Jelinskis et al., "Mobile Application Based Traffic Advisory System for General Aviation—Is It Possible?", 2015 Advances in Wireless and Optical Communications (RTUWO), 2015, 4 pages.
Pratt & Whitney, Digital Engine Services, "Fast(Trademark) Solution" Products and Service Sheet, https://www.pwc.ca/en/products-and-services/services/digital-engine-services/fast-solution, 5 pp.
Pratt & Whitney, Digital Engine Services, "Fast™ Solution" Products and Service Sheet, https://www.pwc.ca/en/products-and-services/services/digital-engine-services/fast-solution, 5 pp.

* cited by examiner

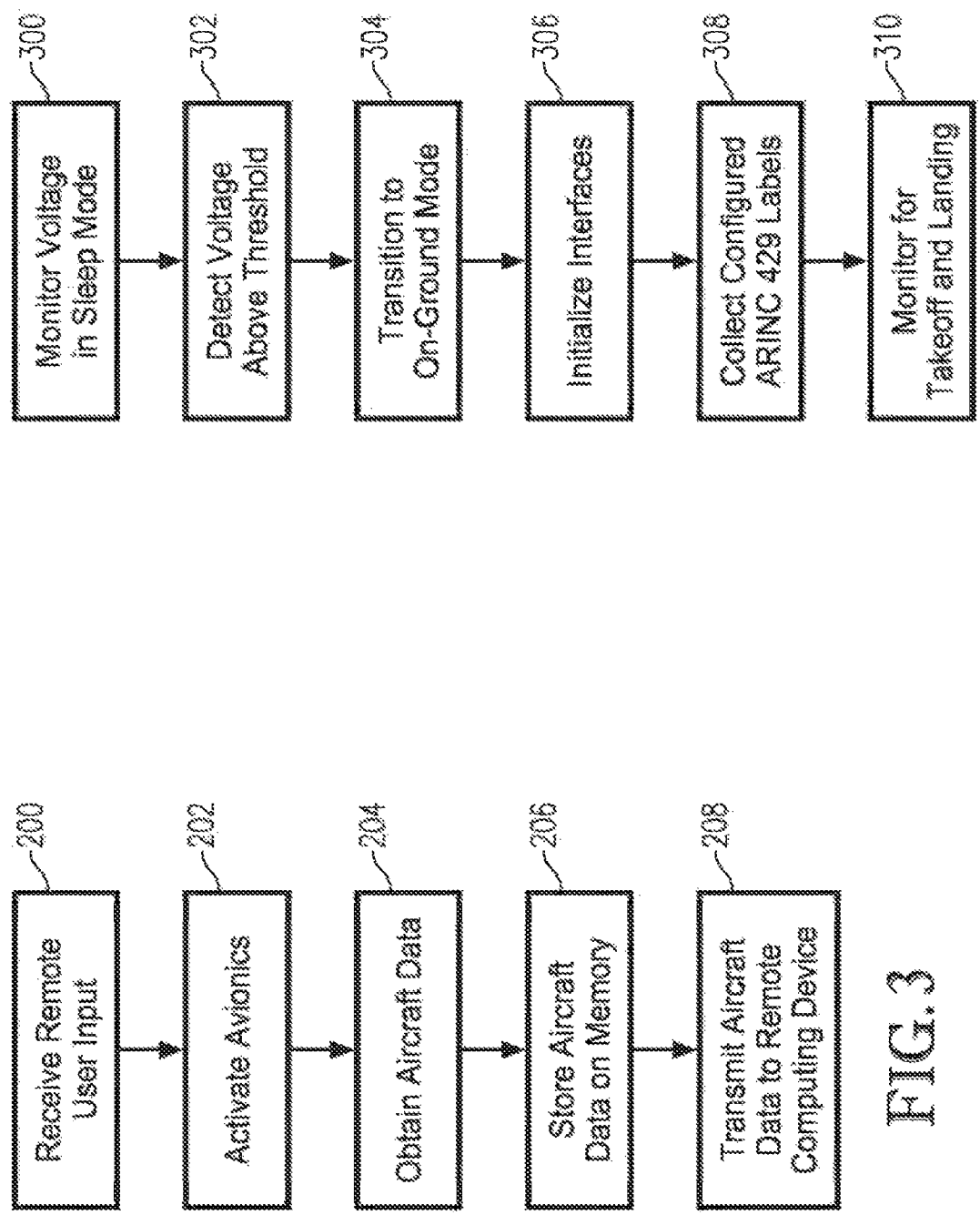

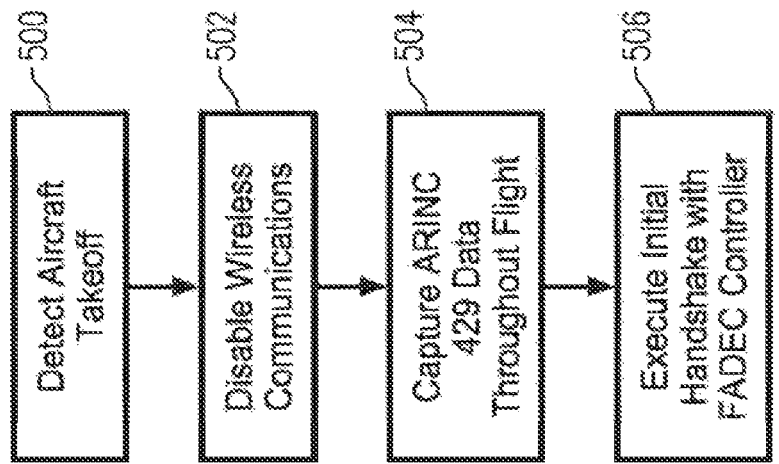
FIG. 6
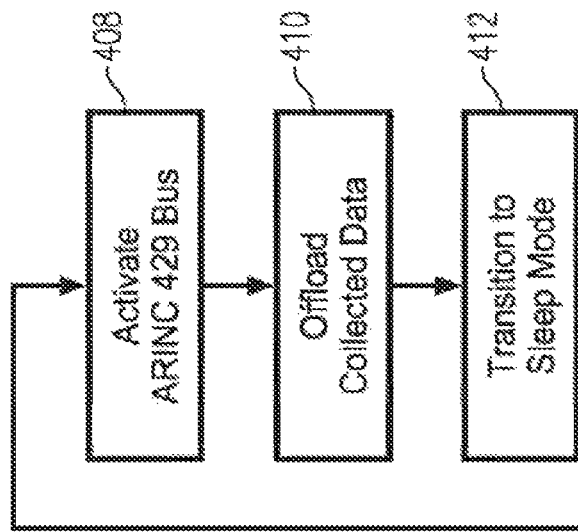
FIG. 5
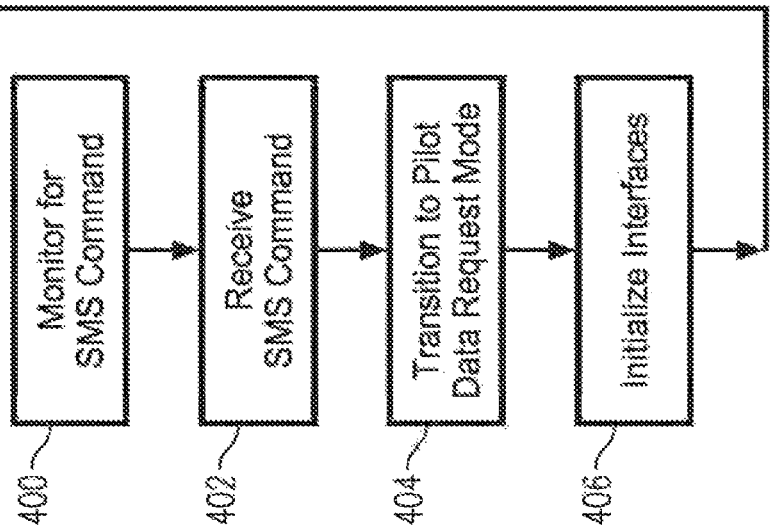

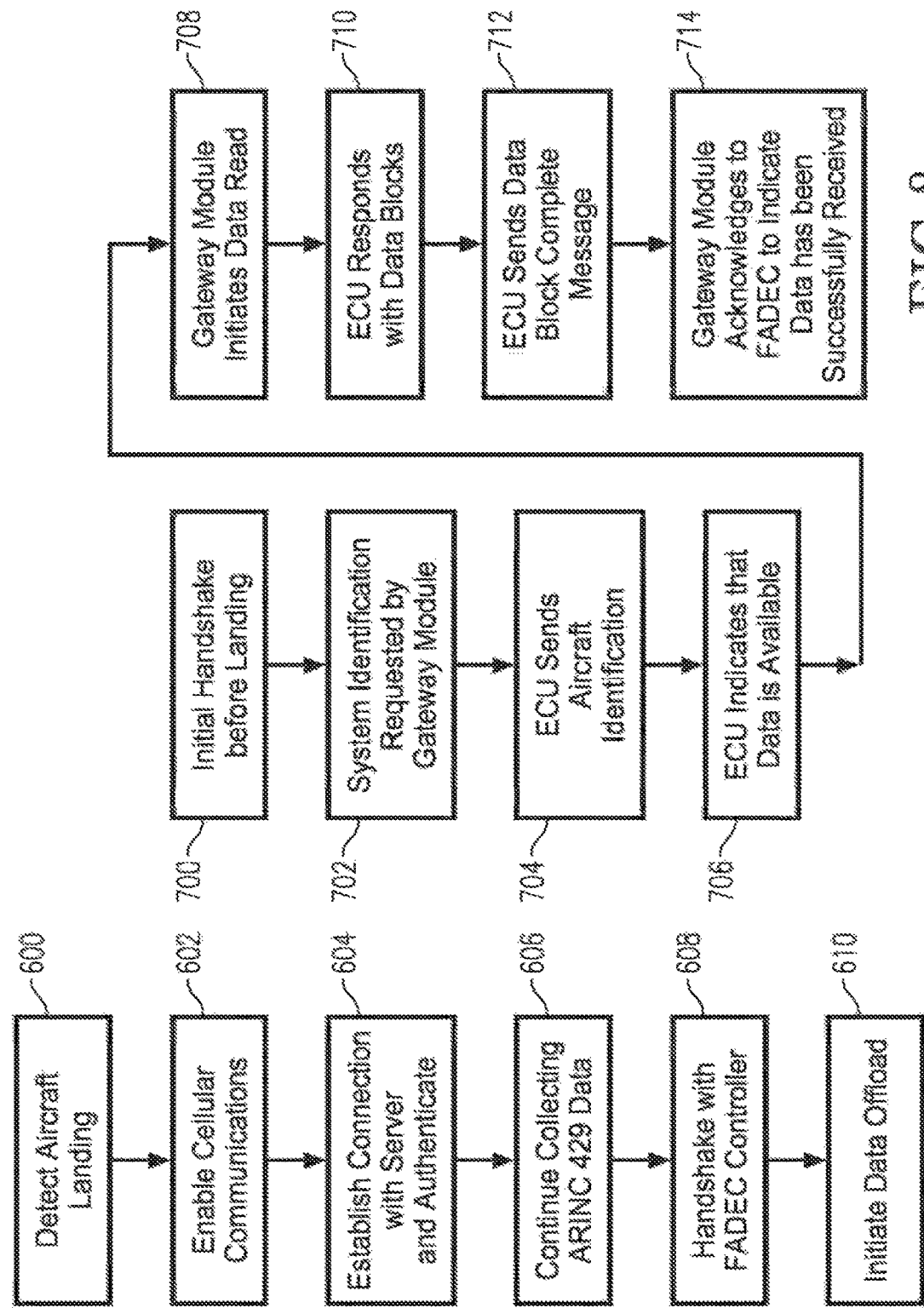

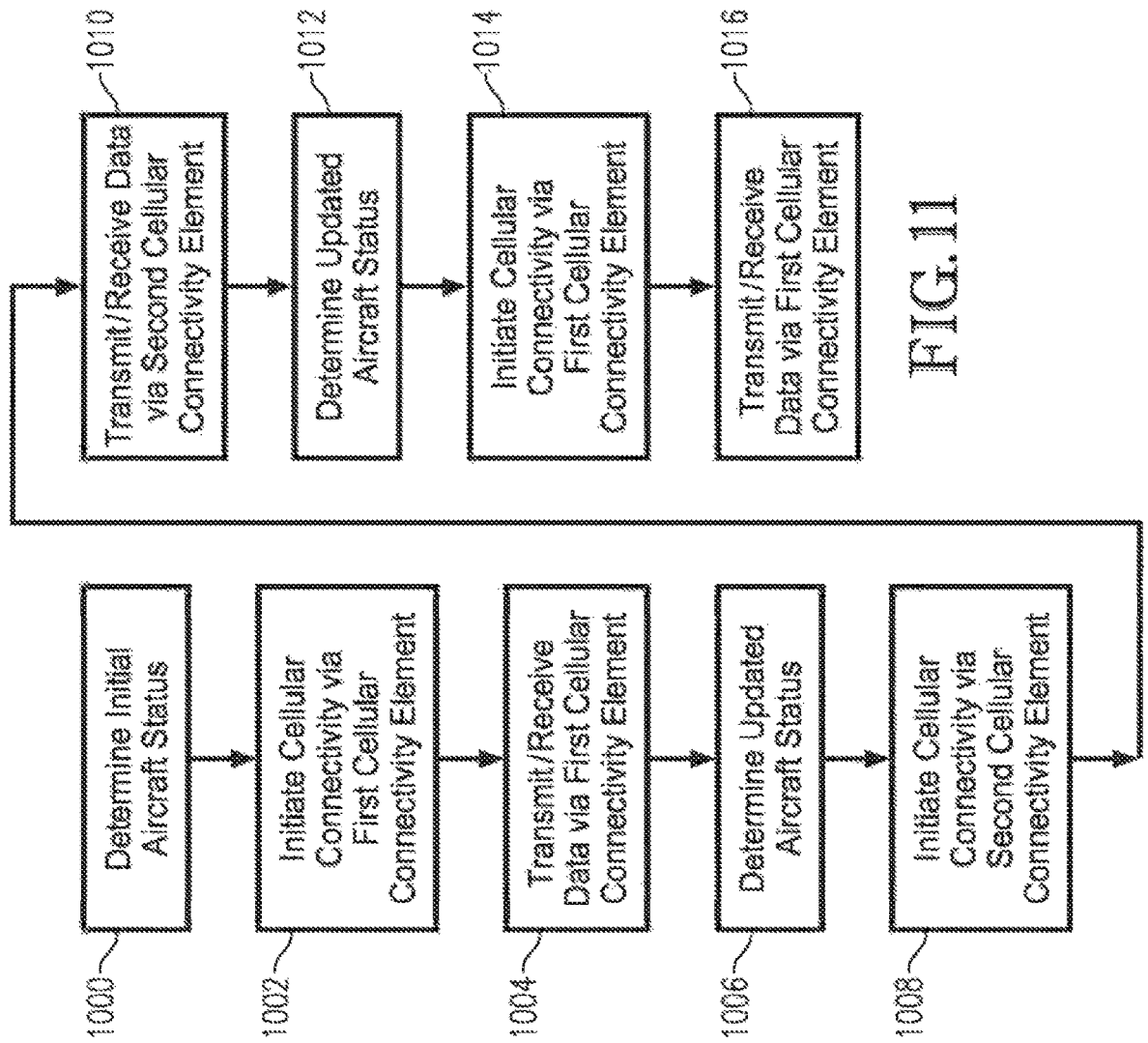

AVIATION CONNECTIVITY GATEWAY MODULE FOR REMOTE DATA OFFLOAD

RELATED APPLICATIONS

This application is a continuation application of U.S. patent application Ser. No. 17/104,500, entitled "Aviation Connectivity Gateway Module for Remote Data Offload" filed Nov. 25, 2020, which claims priority benefit of U.S. Provisional Patent Application Ser. No. 62/941,443, entitled "Aviation Connectivity Gateway Module for Remote Data Offload", filed Nov. 27, 2019, both of which are herein incorporated by reference in their entireties.

BACKGROUND

Aircraft data is often difficult to obtain and is remotely inaccessible after termination of a flight. For example, to check an aircraft's status after the aircraft has been shut down, someone on-site must physically power on the aircraft's avionics. Remotely offloading the status also requires establishing a Wi-Fi connection to equipment in the aircraft's hangar or another access point.

Furthermore, aircraft data is often updated only when the aircraft is receiving power. For example, if the aircraft is shut down with 40 gallons of fuel on board and 20 gallons are subsequently added, the avionics must be turned on in-person to wirelessly transmit the new fuel level of 60 gallons. Some aircraft information is unascertainable without completion of a full engine power cycle.

Unmanned Aerial Systems (UAS) (Unmanned Aerial Vehicles (UAVs) and the equipment for remotely controlling them) require a remote communication medium that is not limited by continuous, direct contact for data transfer and control. UAVs operating beyond visual line of sight (BVLOS) strain the limits of conventional radio frequency networks. An airborne LTE Operations (ALO) cellular initiative supports BVLOS UAS operations. Unfortunately, ALO modules are restricted to a single band, which inhibits communication with certain cellular infrastructure. This creates data transfer and control issues at low altitudes.

SUMMARY

Embodiments of the present invention solve the above-mentioned problems and other related problems and provide a distinct advance in the art of offloading aircraft data. More particularly, the present invention provides an aviation connectivity gateway module for remote access to an aircraft's systems and remotely offloading its aircraft data. The present invention also provides complete BVLOS cellular network connectivity for aircraft communication and control.

An embodiment of the invention is an aviation connectivity gateway module for collecting and offloading data from an aircraft. The aviation connectivity gateway module broadly comprises a central processing unit (CPU), a first set of communication elements, a second set of communication elements, a memory, a battery, an inertial measurement unit (IMU), a global positioning system (GPS) module, and a number of antennas.

The CPU runs an embedded application stored in or on computer-readable medium residing on or accessible by the CPU. The CPU communicates with the other electronic components through serial or parallel links that include address busses, data busses, control lines, and the like.

The first set of communication elements connect to avionics and an electronic control display (ECD) of the aircraft. The first set of communication elements may also be able to connect to external devices via Wi-Fi.

The second set of communication elements connect the aviation connectivity gateway module to the antennas and may include a cellular carrier board and a number of SMA radio or cellular connectors to accommodate Cellular Main, Cellular Diversity, and 433 MHz Radio communications. The second set of communication elements allow the aviation connectivity gateway module to communicate with, receive data from, and offload data to a remote server, or a remote mobile application.

The memory may be any computer-readable non-transitory medium that can store programs or applications for use by or in connection with the CPU. The computer-readable medium can be, for example, but not limited to, an electronic, magnetic, optical, electro-magnetic, infrared, or semi-conductor system, apparatus, or device.

The battery is an internal power supply configured to provide power independently from a power system of the aircraft. The battery may be charged by an alternator or power supply of the aircraft when the aircraft is powered on or when access to the power supply of the aircraft is available.

The IMU derives an orientation at the aviation connectivity gateway module and therefore the aircraft's orientation. In some embodiments, if the GPS module or avionics fail or the aircraft is not equipped with a data bus to offload information, the IMU may be able to generate its own information and send the information to a remote server.

The GPS module includes a GPS antenna and is operable to receive satellite signals from a plurality of GPS satellites. The GPS module or the CPU uses the satellite signals for derivation of position and speed measurements, such as ground speed, climb speed, descent speed, and altitude of the aircraft. In one embodiment, this information is derived via a GPS module of the aircraft or from the IMU or avionics of the aircraft when GPS/satellite signals are not available.

The antennas allow the aviation connectivity gateway module to transmit aircraft data and other data to remote server. The antennas may include an RF antenna (e.g., 433 MHz radio), a cellular antenna, a satellite antenna, a Wi-Fi antenna, a GPS antenna, or any other type of antenna for transmitting, receiving, or broadcasting data over various communication networks.

The aviation connectivity gateway module may operate in several operational states including airborne mode, ground mode, pilot data request mode, sleep mode, and deep sleep mode. In airborne mode, the aviation connectivity gateway module turns off the cellular radio, handshakes with the FADEC, and records a data stream of airborne flight data. In ground mode, the aviation connectivity gateway module 10 records ground data separately from airborne flight data and connects to the cellular network for offloading the airborne flight data.

In use, the aviation connectivity gateway module may offload aircraft data upon receiving a remote user input. First, the CPU may receive a remote user input indicating an invocation to obtain aircraft data from the aircraft's avionics. The CPU then activates the avionics if the avionics are in an inactivated state. Alternatively, the CPU may selectively activate an avionics component such that unnecessary avionics components are left inactivated. The CPU then obtains the aircraft data from the avionics or a selected avionics component and stores the aircraft data on the memory. The CPU then transmits the aircraft data from the memory to the remote server.

Aircraft data collection may be initiated when the aircraft is powered off. In this case, the aviation connectivity gateway module may be in sleep mode monitoring Main Bus Voltage. The aviation connectivity gateway module may then detect that the Main Bus Voltage is above a threshold indicating the aircraft is powered on. The aviation connectivity gateway module may then transition from sleep mode to on-ground mode. The aviation connectivity gateway module may then initialize interfaces according to aircraft configuration as listed in a configuration definition file. The aviation connectivity gateway module may then initiate collection of configured ARINC 429 labels. The aviation connectivity gateway module may then monitor for takeoff and landing to begin collecting data.

The aircraft may also be awoken pursuant to a server request via SMS. First, the aviation connectivity gateway module may be in the sleep mode monitoring for an SMS command. The aviation connectivity gateway module may then receive an SMS command to wake up the aircraft. The aviation connectivity gateway module may then transition to a pilot data request wake mode. The aviation connectivity gateway module may then initialize interfaces according to aircraft configurations listed in a user configuration file. The aviation connectivity gateway module may then activate the ARINC 429 bus. The aviation connectivity gateway module may then offload collected data and an aircraft health status to the server. When data offload is complete, the aviation connectivity gateway module may then transition to the sleep mode.

Aircraft data collection may also correspond to a flight. First, the aviation connectivity gateway module may detect that the aircraft has taken off. The aviation connectivity gateway module may then disable all of its wireless communications. The aviation connectivity gateway module may capture ARINC 429 data throughout the flight. The aviation connectivity gateway module may then execute an initial handshake with the FADEC controller over a FADEC serial protocol during flight.

The aviation connectivity gateway module may then offload the aircraft data upon landing. First, the aviation connectivity gateway module may detect the aircraft landing according to air/ground modes. The aviation connectivity gateway module may then enable cellular communications. The aviation connectivity gateway module may then establish connection with the server and authenticate itself with the server to ensure a unique identity of the aviation connectivity gateway module. The aviation connectivity gateway module may continue collecting ARINC 429 data. The aviation connectivity gateway module may handshake with the FADEC and check for e into data. The aviation connectivity gateway module may then offload collected data to the server via a secure communication connection.

Another embodiment of the invention is an aviation connectivity gateway module for providing complete BVLOS cellular network connectivity for aircraft. The aviation connectivity gateway module broadly comprises a CPU, a set of electronic connectors, a memory, an IMU, a GPS module, a first cellular connectivity element, a second cellular connectivity element, and a number of antennas.

The CPU runs an embedded application stored in or on computer-readable medium residing on or accessible by the CPU. The CPU communicates with the other electronic components through serial or parallel links that include address busses, data busses, control lines, and the like.

The electronic connectors connect the aviation connectivity gateway module to various aircraft components such as aircraft power, a situational awareness device such as camera, and a flight controller. The electronic connectors may include power connectors, ethernet interfaces, serial RS-422, ARINC 429 interfaces, and the like as described above. WiFi may also be used to connect to external devices.

The memory may be any computer-readable non-transitory medium that can store programs or applications for use by or in connection with the CPU. The computer-readable medium can be, for example, but not limited to, an electronic, magnetic, optical, electro-magnetic, infrared, or semi-conductor system, apparatus, or device.

The IMU derives an orientation of the aviation connectivity gateway module and therefore the aircraft's orientation. In some embodiments, if the GPS module or avionics fail or the aircraft is not equipped with a data bus to offload information, the IMU may be able to generate its own information and send the information to a remote server.

The GPS module includes a GPS antenna and is operable to receive satellite signals from a plurality of GPS satellites. The GPS module or the CPU uses the satellite signals for derivation of position and speed measurements, such as ground speed, climb speed, descent speed, and altitude of the aircraft. In one embodiment, this information is derived via a GPS module of the aircraft or from the IMU or avionics of the aircraft when GPS/satellite signals are not available.

The first cellular connectivity element is a standard, full band or multi-band, cellular modem. The first cellular connectivity element provides high speed LTE connectivity and may include 4G LTE connectivity with 3G/2G fallback connectivity and global roaming capabilities.

The second cellular connectivity element is an Airborne LTE Operations (ALO) cellular modem providing 3D network coverage. The second cellular connectivity element operates on only one band and provides cellular connectivity while the aircraft is at altitude. In one embodiment, the second cellular connectivity element may provide cellular connectivity up to 5,000 feet above ground level (AGL). In another embodiment, the second cellular connectivity element may provide cellular connectivity to altitudes higher than 5,000 feet AGL.

The antennas allow the aviation connectivity gateway module to transmit and receive cellular communication signals to a cloud service over a secure IP network. The antennas may be grouped with other antennas such as an RF antenna (e.g., 433 MHz radio), a satellite antenna, a Wi-F antenna, a GPS antenna, or any other type of antenna as described above.

The aviation connectivity gateway module also facilitates cellular connectivity in and between aircraft. First, the aviation connectivity gateway module determines an initial status of the aircraft. For example, the aviation connectivity gateway module may determine that the aircraft is on the ground or is near ground level. Alternatively, the aviation connectivity gateway module may determine the aircraft is below a threshold speed, within or below a predetermined airspace, or in a predetermined phase of flight such as takeoff and climb mode.

The aviation connectivity gateway module may then initiate cellular connectivity via the first cellular connectivity element. For example, the aviation connectivity gateway module may establish a high-speed LTE cellular connection over the cellular network.

The aviation connectivity gateway module may then transmit and receive data via the first cellular connectivity element. For example, the aviation connectivity gateway module may stream a video feed to the cloud service and receive flight control commands.

The aviation connectivity gateway module may then determine an updated status of aircraft. For example, the aviation connectivity gateway module may determine the aircraft is above a threshold altitude. Alternatively, the aviation connectivity gateway module may determine the aircraft is above a threshold speed, within or above a predetermined airspace, or within a pre-determined phase of flight such as cruise flight.

The aviation connectivity gateway module may then initiate cellular connectivity via the second cellular connectivity element. For example, the aviation connectivity gateway module may establish an ALO LTE cellular connection over the cellular network. The aviation connectivity gateway module may then transmit and receive data via the second cellular connectivity element.

The aviation connectivity gateway module may then determine another updated status of aircraft. For example, the aviation connectivity gateway module may determine the aircraft is again below a threshold altitude. Alternatively, the aviation connectivity gateway module may determine the aircraft is below a threshold speed or within, below a predetermined airspace, or within a pre-determined phase of flight such as descent and landing mode.

The aviation connectivity gateway module may then re-initiate cellular connectivity via the first cellular connectivity element. For example, the aviation connectivity gateway module may re-establish a high-speed LTE cellular connection over the cellular network. The aviation connectivity gateway module may then transmit and receive data via the first cellular connectivity element.

The above-described aviation connectivity gateway module provides several advantages. For example, the aviation connectivity gateway module remotely powers aircraft systems and subsystems for data offload. This enables access to aircraft systems and subsystems without starting the aircraft or when conventional data offloading is unavailable. The aviation connectivity gateway module also enables data offloading once an aircraft has landed or after a flight has terminated.

The aviation connectivity gateway module also incorporates dual cellular components to ensure cellular connectivity near the ground and at altitude for complete aircraft control through the duration of the aircraft's flight, data upload and data offload, and data analytics (including for airborne cellular performance). The aviation connectivity gateway module also helps establish a BVLOS network up to, and in some embodiments above, 5,000 feet AGL.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present Invention are described in detail below with reference to the attached drawing figures, wherein:

FIG. 3 is a flow diagram depicting certain steps of a method of offloading aircraft data via the aviation connectivity gateway module of FIG. 1;

FIG. 4 is a flow diagram depicting certain steps of a method of waking up aircraft systems via the aviation connectivity gateway module of FIG. 1;

FIG. 5 is a flow diagram depicting certain steps of another method of offloading aircraft data via the aviation connectivity gateway module of FIG. 1;

FIG. 6 is a flow diagram depicting certain steps of a method of capturing aircraft data via the aviation connectivity gateway module of FIG. 1;

FIG. 7 is a flow diagram depicting certain steps of a method of offloading aircraft data via the aviation connectivity gateway module of FIG. 1;

FIG. 8 is a flow diagram depicting certain steps of a data procurement workflow;

FIG. 11 is a flow diagram depicting certain steps of establishing cellular connectivity via the aviation connectivity gateway module of FIG. 9.

Figure 1:
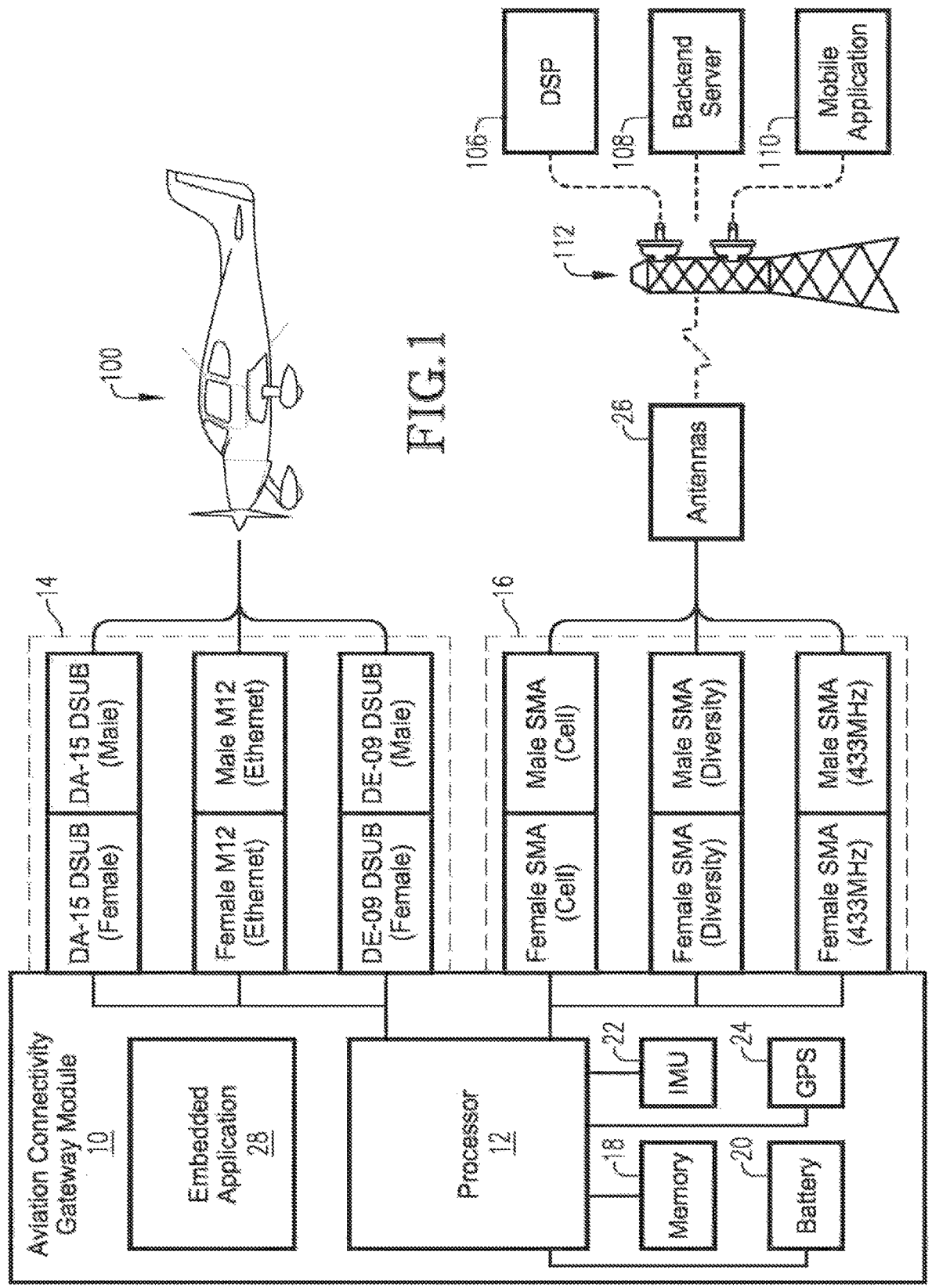
FIG. 1 is a schematic diagram of an aviation connectivity gateway module constructed in accordance with an embodiment of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 2:
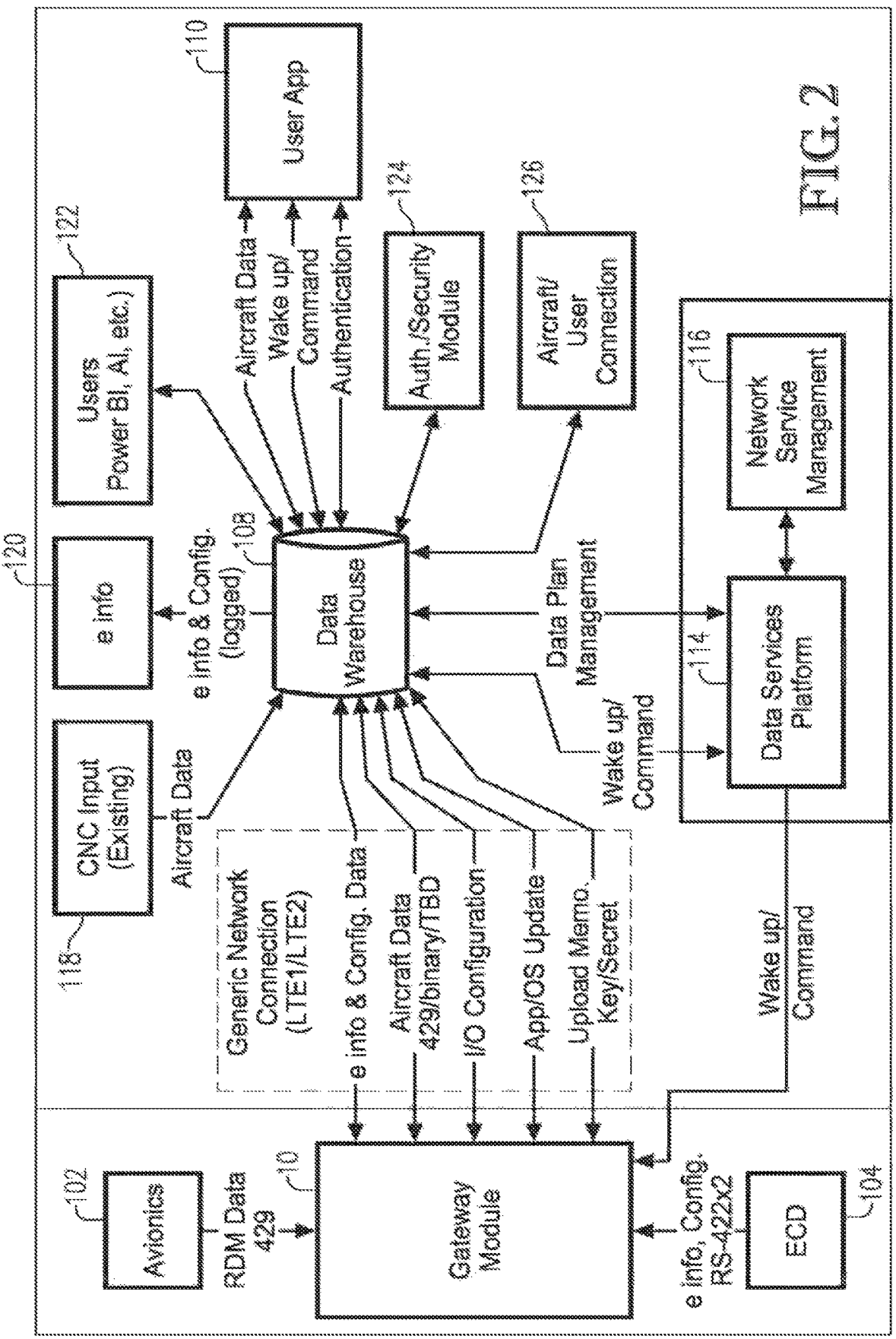
FIG. 2 is a schematic diagram of a network of certain elements configured to communicate with the aviation connectivity gateway module of FIG. 1.

Turning to FIGS. 1 and 2, an aviation connectivity gateway module 10 constructed in accordance with an embodiment of the invention is illustrated. The aviation connectivity gateway module 10 may be adapted for fixed wing, rotorcraft, manned, and unmanned aircraft.

The aviation connectivity gateway module 10 broadly comprises a central processing unit (CPU) 12, a first set of communication elements 14, a second set of communication elements 16, a memory 18, a battery 20, an inertial measurement unit (IMU) 22, a global positioning system (GPS) module 24, and a plurality of antennas 26. The aviation connectivity gateway module 10 may be housed in a machined or molded enclosure and may be mounted or located in an aircraft 100. The enclosure may weigh less than two pounds.

The CPU 12 may implement aspects of the present invention with one or more computer programs (e.g., embedded application 28) stored in or on computer-readable medium residing on or accessible by the CPU 12. Each computer program preferably comprises an ordered listing of executable instructions for implementing logical functions in the processor. Each computer program can be embodied in any non-transitory computer-readable medium, such as the memory 18, for use by or in connection with an instruction execution system, apparatus, or device, such as a computer-based system, processor-containing system, or other system that can fetch the instructions from the instruction execution system, apparatus, or device, and execute the instructions.

The first set of communication elements 14 connect to avionics 102 and an electronic control display (ECD) 104 of the aircraft 100 via ARINC 429 and RS-422 connections. The first set of communication elements may include connectors such as a DE-09 D-Subminiature connector, a DA-15 D-Subminiature connector, and an M12 4 POS connector for an ethernet connection. The DE-09 D-Subminiature connector may accommodate hot bus power, ARINC 429, RS-422 Tx/Rx Ch A, Switched Power ADC, and 2× Low Side Digital Out. The DA-15 D-Subminiature connector may accommodate RS-422 Tx/Rx Ch B and 2× Low Side Digital out. The M12 4 POS accommodates an ethernet connection. The first set of communication elements 14 may also be able to connect to external devices via Wi-Fi. The first set of communication elements 14 may be connected to electrically isolated portions of the aviation connectivity gateway module 10 or two electrically isolated printed circuit boards to prevent channel crossover and prevent transmission of bad data from one side of the aviation connectivity gateway module 10 to the other.

The second set of communication elements 16 connect the aviation connectivity gateway module 10 to the antennas 26 and may include a cellular carrier board and a number of SMA radio or cellular connectors to accommodate Cellular Main, Cellular Diversity, and 433 MHz Radio communications. The second set of communication elements 16 allow the aviation connectivity gateway module 10 to communicate with, receive data from, and offload data to a DSP 106, a remote server 108, or a remote mobile application 110 via a network including ground-based antennas 112.

The memory 18 may be any computer-readable non-transitory medium that can store programs or applications for use by or in connection with the CPU. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The battery 20 may be an internal power supply configured to provide power independently from a power system of the aircraft 100. The battery 20 may be charged by an alternator or power supply of the aircraft 100 when the aircraft 100 is powered on or when access to the power supply of the aircraft 100 is available.

The IMU 22 derives an orientation of the aviation connectivity gateway module 10 and therefore the aircraft's orientation. In some embodiments, if the GPS module 24 or avionics fail or the aircraft is not equipped with a data bus to offload information, the IMU 22 may be able to generate its own information and send the information to a remote server.

The GPS module 24 includes a GPS antenna and is operable to receive satellite signals from a plurality of GPS satellites. The GPS module 24 or the CPU 12 use the satellite signals for derivation of position and speed measurements, such as ground speed, climb speed, descent speed, and altitude of the aircraft. In one embodiment, this information is derived via a GPS module of the aircraft 100 or from the IMU 22 or avionics 102 of the aircraft 100 when GPS/satellite signals are not available.

The antennas 26 allow the aviation connectivity gateway module 10 to transmit aircraft data and other data to remote server 108 via the ground-based antennas 112. The antennas 26 may include an RF antenna (e.g., 433 MHz radio), a cellular antenna, a satellite antenna, a Wi-Fi antenna, a GPS antenna, or any other type of antenna for transmitting, receiving, or broadcasting data over various communication networks. The radios may be used for small data packet transmission of information such as tire pressure, door lock commands, or cargo or load tags or the like with individual identification capability.

In some embodiments, the aviation connectivity gateway module 10 may also include or be connected to a recoverable data module (RDM). For example, the aviation connectivity gateway module 10 may be attached to an RDM-300, which is an existing flight data recorder. The RDM may save information in real time on hardened memory.

The aviation connectivity gateway module 10 may operate in several operational states including airborne mode, ground mode, pilot data request mode, sleep mode, and deep sleep mode. In airborne mode, the aviation connectivity gateway module 10 turns off the cellular radio, handshakes with the FADEC, and records a data stream of airborne flight data. In ground mode, the aviation connectivity gateway module 10 records ground data separately from airborne flight data and connects to the cellular network for offloading the airborne flight data.

The aviation connectivity gateway module 10 offloads flight data and aircraft data via satellite, Wi-Fi, or cellular directly or from an avionics data bus such as ARINC 429 to the remote server 108 (or a cloud service). Other backup offloading connectivity pathways, such as 4G connectivity with 3G, and 2G backup connectivity modes may be used. Operators, manufacturers, and pilots may remotely receive the offloaded data from the aircraft 100 via the aviation connectivity gateway module 10.

The aviation connectivity gateway module 10 may only transmit data when the aircraft 100 is on the ground due to regulations of inflight use of cellular networks or to prevent in-flight tampering. Such ground transmission may be triggered by a switch or other physical device on the aircraft. When the switch is triggered, the aviation connectivity gateway module 10 may begin the cellular connection process to start the data offload.

In some embodiments, the switch may be triggered automatically by the application of weight on the wheels or weight on the skids of an aircraft 100. In some embodiments, a strut of the aircraft 100 may help to detect when the aircraft 100 is grounded because, as the strut compresses, it may trigger a squat switch. A squat switch may power some systems on the aircraft 100 and indicates whether the aircraft 100 is airborne or on the ground.

Alternatively, a software-configured switch may be used in conjunction with the GPS module 24 or another system to disable cellular transmission based on a groundspeed or airspeed speed setting. This speed setting may be set at different values based on aircraft type and operation. The software-configured switch may incorporate a de-bounce time to prevent repeated on and off cycling. The speed setting and de-bounce time may enable or disable functions just as a physical switch but operates in lieu of a physical.

Once the aircraft 100 lands, data may be offloaded in seconds. If the system does not finish offloading data by the time the aircraft's power is turned off, the aviation connectivity gateway module 10 may stay powered using the aircraft's battery or its own battery 20 for a predetermined length of time to finish offload data, after which it turns itself off.

The aviation connectivity gateway module 10 may collect aircraft data related to the aircraft's engine, flight pattern, pitch, roll, yaw, speed, and altitude. This data can be analyzed to determine aircraft health, fleet health, and fleet trends. In some embodiments, the aviation connectivity gateway module 10 may offload and record data from engines equipped with Full Authority Digital Engine Control (FADEC), which controls engine performance with minimal pilot input for maximum efficiency and optimal operating parameters. Current state information may be obtained in real time.

The aviation connectivity gateway module 10 may execute a health status check through Built-In-Tests (BITs) and compile results into a file that can be transmitted over the air to the remote server 108. The health status check may be executed upon the aircraft's transition to an Active On-Ground state, for example.

Data may be offloaded in packets in reverse order, giving primary importance to the most recent data. If, for example, the aircraft crashes, the most important data is the most recent flight data. In the event of a crash, embodiments may maintain battery power for a length of time and the most recent data may be sent to the remote server ahead of data from earlier in the flight. The packets may be small such that, in the event of interruption, smaller portions of data may be lost, rather than losing the data from an entire flight.

The aviation connectivity gateway module 10 may triangulate based on satellite or cellular data to locate the aircraft 100 in the event of a crash or incident. If data was not offloaded before the crash, data collected by the RDM may be offloaded.

The GPS module 24 may generate raw location and speed information for later analysis. The analysis may include fleet and trend monitoring and flight safety. The CPU 12 may record the orientation of the aviation connectivity gateway module 10 (and hence the aircraft's orientation) via the IMU 22. The aviation connectivity gateway module 10 may automatically generate alerts if the aircraft is operating or being operated outside of normal use or normal envelopes.

The aviation connectivity gateway module 10 enters pilot data request mode upon receiving a pilot data request. In pilot data request mode, the aviation connectivity gateway module 10 powers up the avionics to collect ARINC data and transmit it to the server 108 before returning to sleep mode.

Sleep mode is a lower power state in which the aviation connectivity gateway module 10 waits to react to a number of inputs such as an SMS command, a 433 MHz transmission, the aircraft battery dropping below a certain threshold, and a pilot powering up the aircraft 100. The aviation connectivity gateway module 10 may switch to sleep mode after uploading airborne flight data, ground flight data, e info, a configuration file, and a shared secret (i.e., a symmetric encryption key used to sign an SMS command). The aviation connectivity gateway module 10 can actively control the discrete outputs while in sleep mode. Deep sleep mode is a minimum power state with all radios and the CPU 12 off, with only main bus voltage being monitored.

In some embodiments, a sleep mode transition may occur after the aircraft 100 is powered off, thus de-energizing the aircraft's main power bus. The aviation connectivity gateway module 10 may detect the aircraft's power off state and complete transferring flight data or may time-out if not completed transferring flight data. The aviation connectivity gateway module 10 may upload the shared secret. The aviation connectivity gateway module may then transition to the sleep mode and monitor for aircraft power-on, low-battery, or an SMS command.

In sleep mode, the aviation connectivity gateway module 10 may monitor for a low power signal and may detect low battery voltage according to a configured threshold. The aviation connectivity gateway module 10 may then power on and notify the server 108 of the last known pilot data request state. The gateway connectivity module may then transition to deep sleep mode and monitor for input switched power.

In some embodiments, the aviation connectivity gateway module 10 may be in a powered state on the aircraft 100 and may always be in a powered state. In some embodiments, the aviation connectivity gateway module 10 may be in low power state, deep sleep state, or ultra-low power state, drawing tenths of milliamps. The aviation connectivity gateway module 10 may run up to 6 months without starting the aircraft 100 or requiring recharging of the battery while routinely requesting status updates.

The aviation connectivity gateway module 10 may connect to the aircraft 100 using a satellite, Wi-Fi, or cellular connection through text (SMS) data. A user may send a wake-up command to the aviation connectivity gateway module 10, which will in turn wake up and power on the aircraft's avionics and pull sensor readings from the aircraft sensors. In some embodiments, these readings may include fuel level, oil pressure, oil, temperature, cylinder temperature, current software and firmware versions, and other readings. In some embodiments, these readings may come directly from the avionics devices and may be obtained remotely.

In another embodiment, the aviation connectivity gateway module 10 may receive a command via satellite, Wi-Fi, or cellular to transmit a message over 433 MHz to lock or unlock the aircraft's doors. In another embodiment, discrete pins of the aviation connectivity gateway module 10 may be used to directly power a relay and/or solenoid to lock or unlock doors.

The aviation connectivity gateway module 10 may collect data either independently, from the aircraft 100, or both. If the aircraft's avionics have failed or the aircraft is not equipped with a data bus to offload information, the aviation connectivity gateway module 10 may generate its own data. The aviation connectivity gateway module 10 may compress and concentrate data before transmitting or broadcasting it or sending it to a second data module such as the RDM.

As an alternative to turning on all avionics in the aircraft 100 to transmit data, some embodiments may only power on the necessary systems in the aircraft 100 to transmit the requisite data. For example, systems in the aircraft 100 may store multiple levels of information. The avionics may have a central information computer, a display unit, an air data computer, and an engine system processor. Different pieces of data for the aircraft 100 may be stored in different subsystems in the aviation connectivity gateway module 10. In some embodiments, a satellite, Wi-Fi, or cellular connection may be used to wake up only the necessary systems to transmit the necessary data.

In some embodiments, a fuel sender unit or an oil temperature sender unit may be connected to an engine system processor and/or central computer in the aircraft 100. Some embodiments may send a wake-up event through the aviation connectivity gateway module 10 to power on the central computer to enable the aviation connectivity gateway module 10 to send data regarding the oil temperature to the server 108. The wake-up event may be tailored to a subsystem, such that the display and instrumentation of the aircraft 100 would not also be woken up to send the information. In some embodiments, the data may be saved to the aviation connectivity gateway module 10 and transmitted to the server 108 when it is offloaded.

The aviation connectivity gateway module 10 may offload data to a remote server 108 via a satellite constellation, cellular connections, or both satellite and cellular connections. For example, the aviation connectivity gateway module 10 may default to a cellular connection and use satellite communication as a backup if it is out of cellular connection range.

The remote server 108 ("data warehouse" in FIG. 2) serves and is accessible to various external, remote, or third party entities such as the remote application 110, a data services platform 114, network service management 116, CNC input source 118, e info aggregator, data users (Power BI, AI, and the like) 122, an authorization/security module 124, an aircraft/user connection. For example, wake up commands entered into the remote application 110 may be fed through the remote server 108 to the data services platform 114 to the aviation connectivity gateway module 10.

In some embodiments, information may be retrieved by a manufacturer and then sent to a user. For example, a user may connect to the aircraft 100 remotely anywhere in the world to determine if the aircraft 100 was property stored in a hangar by checking on the fuel, oil, engine component, or ambient temperature relative to the outside reported temperature of its geographic location. If, for example, the location had an outside temperature of 0° C. and the oil temperature was 20° C. several hours after flight, the aircraft 100 is most likely properly stored in the hangar.

In some embodiments, a user may Install firmware updates and software updates remotely through text messaging with a preloaded packet of information sent via satellite, Wi-Fi, or cellular network. In other embodiments, the aviation connectivity gateway module 10 may connect over Bluetooth or a satellite connection to offload or upload data. The aviation connectivity gateway module may upload data through Short Burst Data (SBD) or via a satellite service.

In some embodiments the aviation connectivity gateway module 10 may manage cellular networks through a parameter in a configuration file loaded onto the aviation connectivity gateway module 10. When a network cannot be reached, the aviation connectivity gateway module 10 may fall back to another SIM and attempt to connect to another network. The configuration file contains an updatable list of parameters stored on the aviation connectivity gateway module 10 to change behavior without a software update. The parameters may include configuration file version, battery voltage shutdown, on-ground threshold, power-down mode time, on-ground time, airborne time, pilot data request minimum time, pilot data request maximum time, and ARINC 429 baud rate. The configuration file version is a serial version number Battery voltage shutdown is a value that triggers a final data transmission followed by sleep mode. On-ground threshold is a value below which the aircraft is considered grounded. Power-down mode time is a maximum time the aviation connectivity gateway module 10 will remain on after the main bus is de-energized. On-ground time is a minimum amount of time the aviation connectivity gateway module 10 detects a ground status before switching to on-ground mode. Airborne time is a minimum amount of time the aviation connectivity gateway module 10 detects an airborne status before switching to on-airborne mode. Pilot data request minimum time is a minimum time to record ARINC data to send back for a pilot data request. Pilot data request maximum time is a maximum time to record ARINC data to send back for the pilot data request. ARINC 429 baud rate is a high or low speed communication rate.

The aviation connectivity gateway module 10 may also generate a local store containing data the aviation connectivity gateway module 10 can determine but may not have available at power up. The aviation connectivity gateway module 10 may read this the local store and use this data until it determines this data itself. If the determined data differs from data in the local store, the aviation connectivity gateway module 10 will overwrite the data in the local store with the determined data.

Turning to FIG. 3, a method of remotely obtaining aircraft data will now be described. First, The CPU 12 may receive a remote user input indicating an invocation to obtain aircraft data from the aircraft's avionics, as shown in block 200. For example, the user input may be a text message or a 433 MHz signal.

The CPU 12 then activates the avionics if the avionics are in an inactivated state, as shown in block 202. Alternatively, the CPU 12 may selectively activate an avionics component such that unnecessary avionics components are left inactivated.

The CPU 12 then obtains the aircraft data from the avionics or a selected avionics component, as shown in block 204. The CPU 12 then stores the aircraft data on the memory 18, as shown in block 206.

The CPU 12 then transmits the aircraft data from the memory 18 to the remote server 108, as shown in block 208. Alternatively, the CPU 12 may transmit the aircraft data directly from the avionics without temporarily storing the aircraft data.

In this way, the aviation connectivity gateway module 10 remotely powers aircraft systems and subsystems for data offload. This enables access to aircraft systems and subsystems without starting the aircraft or when conventional data offloading is unavailable.

Turning to FIG. 4, a method of powering on the aircraft 100 will now be described. First, the aviation connectivity gateway module 10 may be in sleep mode monitoring Main Bus Voltage, as shown in block 300. The aviation connectivity gateway module 10 may then detect that the Main Bus Voltage is above a threshold indicating the aircraft 100 is powered on, as shown in block 302. The aviation connectivity gateway module 10 may then transition from sleep mode to on-ground mode, as shown in block 304. The aviation connectivity gateway module 10 may then initialize interfaces according to aircraft configuration as listed in a configuration definition file, as shown in block 306. The aviation connectivity gateway module 10 may then initiate collection of configured ARINC 429 labels, as shown in block 308. The aviation connectivity gateway module 10 may then monitor for takeoff and landing, as shown in block 310.

Turning to FIG. 5, a method of waking up the aircraft 100 pursuant to a server request via SMS command will now be described. First, the aviation connectivity gateway module 10 may be in the sleep mode monitoring for an SMS command, as shown in block 400. The aviation connectivity gateway module 10 may then receive an SMS command to wake up the aircraft 100, as shown in block 402. The aviation connectivity gateway module 10 may then transition to a pilot data request wake mode, as shown in block 404. The aviation connectivity gateway module 10 may then initialize interfaces according to aircraft configurations listed in a user configuration file, as shown in block 406. The aviation connectivity gateway module 10 may then activate ARINC 429 bus through discrete output, as shown in block 408. The aviation connectivity gateway module 10 may then offload collected data and an aircraft health status to the server 108, as shown in block 410. When data offload is complete, the aviation connectivity gateway module 10 may then transition to the sleep mode, as shown in block 412.

Turning to FIG. 6, data collection via the aviation connectivity gateway module 10 during flight will now be described. First, the aviation connectivity gateway module 10 may detect that the aircraft has taken off, as shown in block 500. The aviation connectivity gateway module 10 may then disable all of its wireless communications, as shown in block 502. The aviation connectivity gateway module 10 may continue to capture ARINC 429 data throughout the flight, as shown in block 504. The aviation connectivity gateway module 10 may then execute an initial handshake with the FADEC controller over a FADEC serial protocol during flight, as shown in block 506.

Turning to FIG. 7, data offloading via the aviation connectivity gateway module 10 upon landing will now be described. First, the aviation connectivity gateway module 10 may detect the aircraft landing according to air/ground modes, as shown in block 600. The aviation connectivity gateway module 10 may then enable cellular communications, as shown in block 602. The aviation connectivity gateway module 10 may then establish connection with the server 108 and authenticate itself with the server 108 to ensure a unique identity of the aviation connectivity gateway module 10, as shown in block 604. The aviation connectivity gateway module 10 may continue collecting ARINC 429 data, as shown in block 606. The aviation connectivity gateway module 10 may handshake with the FADEC and check for e info data, as shown in block 608. The aviation connectivity gateway module 10 may then offload collected data to the server 108 via a secure communication connection, as shown in block 610. The secure connection protects the aviation connectivity gateway module 10 from unintentional commands, eavesdropping, capture-replay, and other attack methods. As such, the aviation connectivity gateway module 10 enables data offloading once an aircraft has landed or after a flight has terminated.

Turning to FIG. 8, a data procurement workflow will now be described. First, aviation connectivity gateway module 10 may initiate a handshake before landing, as shown in block 700. The aviation connectivity gateway module 10 may then request aircraft identification, as shown in block 702. The aircraft's engine control unit (ECU) may then send aircraft identification in response, as shown in block 704. The ECU may then indicate that data is available, as shown in block 706. The aviation connectivity gateway module 10 may then initiate a data read, as shown in block 708. The ECU may then respond by transmitting data blocks, as shown in block 710. The ECU may then indicate a complete message has been sent, as shown in block 712. The aviation connectivity gateway module 10 may then acknowledge the data has successfully been received, as shown in block 714.

Figure 9:
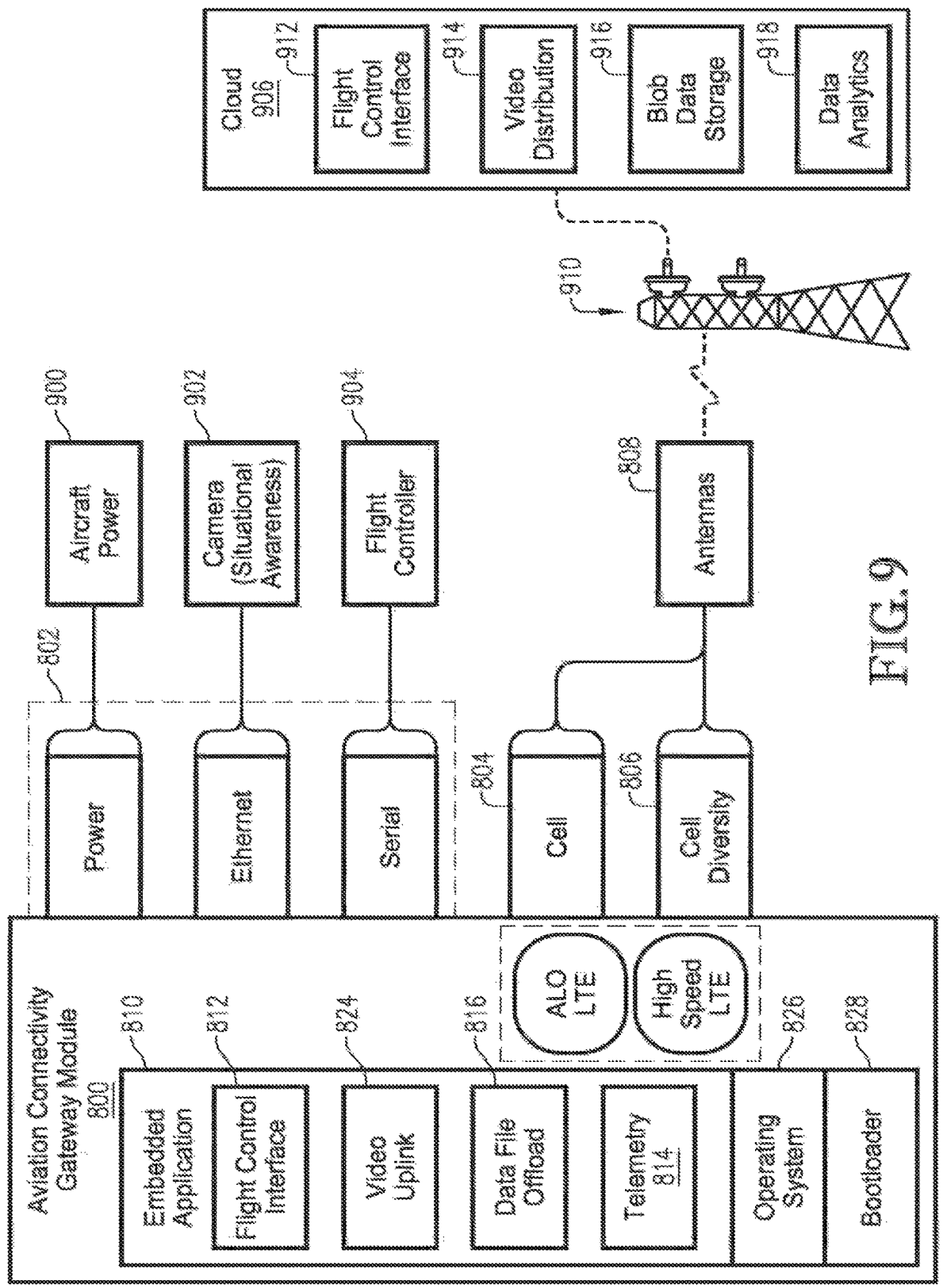
FIG. 9 is a schematic diagram of an aviation connectivity gateway module constructed in accordance with another embodiment of the invention.
Figure 10:
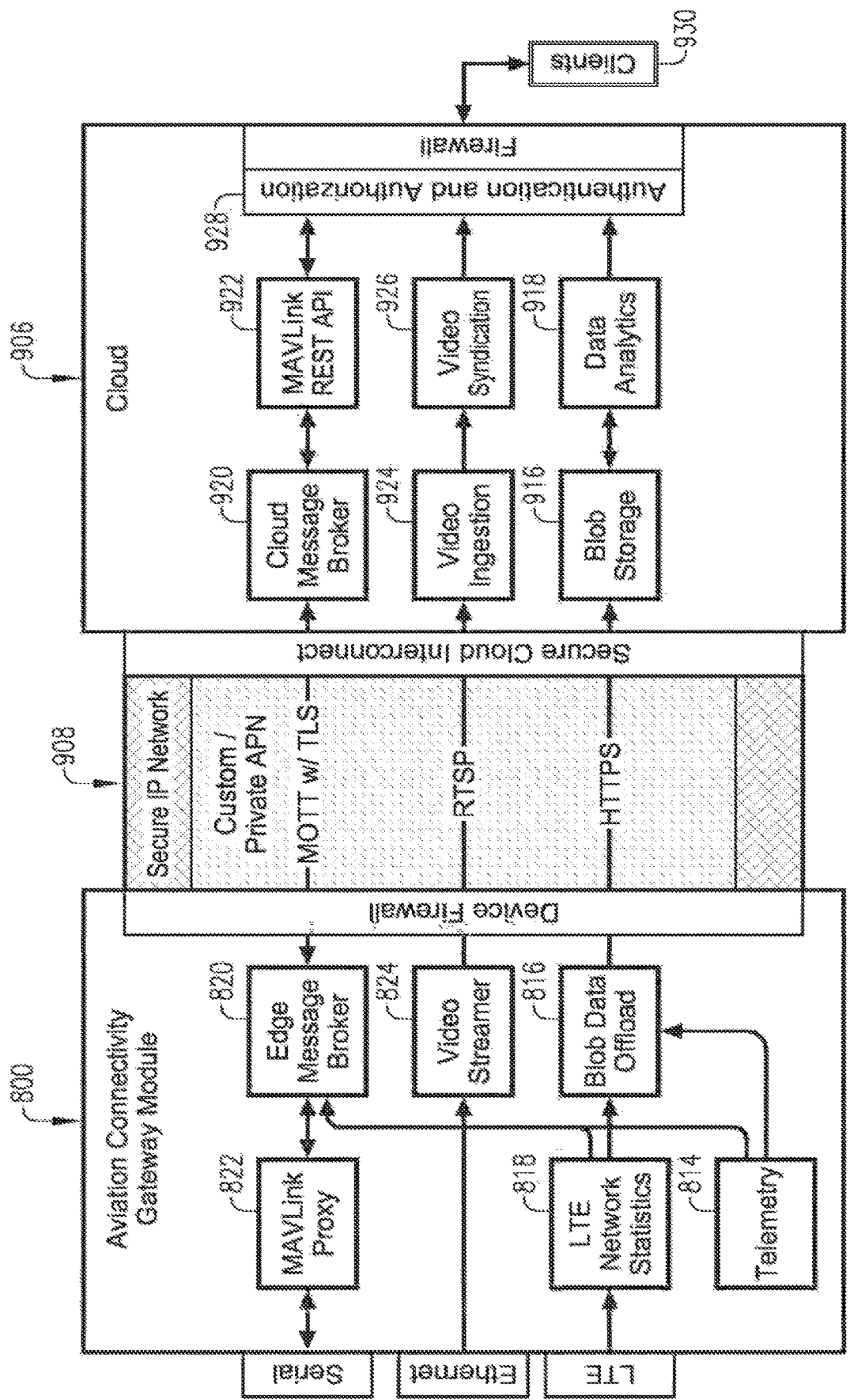
FIG. 10 is a schematic diagram of a network of certain elements configured to communicate with the aviation connectivity gateway module of FIG. 9.

Turning to FIGS. 9 and 10, an aviation connectivity gateway module 800 constructed in accordance with another embodiment of the invention is illustrated. The aviation connectivity gateway module 800 provides cellular connectivity and establishes a Beyond Visual Line of Sight (BVLOS) network for aircraft. The aviation connectivity gateway module 800 may be adapted for fixed wing, rotorcraft, manned, and unmanned aircraft including unmanned aerial systems (UAS) and unmanned aerial vehicles (UAV).

The aviation connectivity gateway module 800 broadly comprises a central processing unit (CPU), a set of electronic connectors 802, a memory, an inertial measurement unit (IMU), a global positioning system (GPS) module, a first cellular connectivity element 804, a second cellular connectivity element 806, and a plurality of antennas 808. The aviation connectivity gateway module 800 may be housed in a machined or molded enclosure and may be mounted to or located in an aircraft. The enclosure may weigh less than two pounds.

The CPU may implement aspects of the present invention with one or more computer programs (or applications) stored in or on computer-readable medium residing on or accessible by the CPU. Each computer program preferably comprises an ordered listing of executable instructions for implementing logical functions in the processor. Each computer program can be embodied in any non-transitory computer-readable medium, such as the memory, for use by or in connection with an instruction execution system, apparatus, or device, such as a computer-based system, processor-containing system, or other system that can fetch the instructions from the instruction execution system, apparatus, or device, and execute the instructions.

The electronic connectors 802 connect the aviation connectivity gateway module 800 to various aircraft components such as aircraft power 900, a situational awareness device such as camera 902, and a flight controller 904. The electronic connectors 802 may include power connectors, ethernet interfaces, serial RS-422, ARINC 429 interfaces, and the like as described above. WiFi may also be used to connect to external devices. The electronic connectors 802 may be connected to electrically isolated portions of the aviation connectivity gateway module 800 or two electrically isolated printed circuit boards to prevent channel crossover and prevent transmission of bad data from one side of the aviation connectivity gateway module 800 to the other.

The memory may be any computer-readable non-transitory medium that can store programs or applications for use by or in connection with the CPU. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The IMU derives an orientation of the aviation connectivity gateway module 800 and therefore the aircraft's orientation. In some embodiments, if the GPS module or avionics fail or the aircraft is not equipped with a data bus to offload information, the IMU may be able to generate its own information and send the information to a remote server.

The GPS module includes a GPS antenna and is operable to receive satellite signals from a plurality of GPS satellites. The GPS module or the CPU uses the satellite signals for derivation of position and speed measurements, such as ground speed, climb speed, descent speed, and altitude of the aircraft. In one embodiment, this information is derived via a GPS module of the aircraft 100 or from the IMU or avionics of the aircraft 100 when GPS/satellite signals are not available.

The first cellular connectivity element 804 may be a standard, full band or multi-band, cellular modem. The first cellular connectivity element 804 provides high speed LTE connectivity and may include 4G LTE connectivity with 3G/2G fallback connectivity and global roaming capabilities. The first cellular connectivity element 804 may be connected to a daughter card within the aviation connectivity gateway module 800.

The second cellular connectivity element 806 is an Airborne LTE Operations (ALO) cellular modem providing 3D network coverage. The second cellular connectivity element 806 operates on only one band and provides cellular connectivity while the aircraft 100 is at altitude. The second cellular connectivity element 806 may be connected to a daughter card within the aviation connectivity gateway module 800. In one embodiment, the second cellular connectivity element 806 may provide cellular connectivity up to 5,000 feet above ground level (AGL). In another embodiment, the second cellular connectivity element 806 may provide cellular connectivity to altitudes higher than 5,000 feet AGL.

The antennas 808 allow the aviation connectivity gateway module 800 to transmit and receive cellular communication signals to a cloud service 906 (described below) over a secure IP network 908 via ground-based cellular towers 910. The antennas 808 may be grouped with other antennas such as an RF antenna (e.g., 433 MHz radio), a satellite antenna, a Wi-Fi antenna, a GPS antenna, or any other type of antenna as described above.

In some embodiments, the aviation connectivity gateway module 800 may also include or be connected to a recoverable data module (RDM). For example, the aviation connectivity gateway module 800 may be attached to an RDM-300, which is an existing flight data recorder. The RDM may save information in real time on hardened memory.

The aviation connectivity gateway module 800 may run software (e.g., embedded application 810) for aggregating and offloading data from a variety of on-aircraft sources via the first cellular connectivity element 804 when the aircraft is on the ground and the second cellular connectivity element 806 when the aircraft is airborne or above a predetermined altitude. The software may include several functions or applications including a flight control interface 812, telemetry 814, blob data offload 816, LTE network statistics 818, an edge message broker 820, a mavlink proxy 822, and video streaming 824. The aviation connectivity gateway module 800 may also include an onboard trusted platform module 826 and a secure boot 828.

Telemetry 814 collects instrumentation and aircraft performance data. This data can be forwarded to the blob data offload 816 application for batch upload.

Blob data offload 816 manages a circular buffer of binary large object data (blob) files for each data providing application (e.g., Telemetry 814). The data files are periodically uploaded to the cloud service 906 (described below) via the first cellular connectivity element 804 (high speed LTE connection) when the aircraft is on the ground. Authentication may be provided by a JSON web token-based mechanism and is secured by transport layer security (HTTPS).

LTE network statistics collects ALO LTE cellular network quality and performance related statistics such as RSRP, RSRQ, SNR, Cell ID, TAC, MNC, and MCC. Data may be published to the edge message broker 820 to allow for real-time monitoring of network information and may be forwarded to the blob data offload 816 application for batch upload.

The edge message broker 820 provides a pub/sub message store resident on the aviation connectivity gateway module 800, which bridges communication to the cloud service 906 via the second cellular connectivity element 806 (ALO LTE connection) while the aircraft is airborne or at altitude. If the aircraft is on the ground or at very low altitude, communications may transition to the first cellular connectivity element 804 (high speed LTE connection).

The mavlink proxy 822 bridges communication between the ground control station (GCS) and the aircraft's flight controller 904. The mavlink proxy 822 receives data via the serial interface and publishes to the edge message broker 820 to forward communications back to the GCS via the cloud service's message broker (described below). For communications from the GCS, the mavlink proxy subscribes to topics on the cloud service's message broker and forwards the received messages over the serial interface (one of the electronic connectors 802) to the aircraft's flight controller 904. These messages may or may not be inspected or validated.

Video streaming 824 receives an encoded video data stream via the ethernet interface (one of the electronic connectors 802). Video streaming publishes as an RTSP video stream to the cloud service's video ingestion (described below) via the second cellular connectivity element 806 (ALO LTE connection) while the aircraft is airborne or at altitude. If the aircraft is on the ground or at very low altitude, the video stream may transition to the first cellular connectivity element 804 (high speed LTE connection). Transport layer security (TLS) may be added to further secure video streaming authentication. Alternatively, a cellular carrier VPN may provide an end-to-end secure channel to the cloud service's TLS.

The cloud service 906 may provide several functions or applications including cloud message broker 920, mavlink REST API 922, video ingestion 924, video syndication 926, blob storage 916, data analytics 918, and authorization and authentication 928. Cloud message broker 920 may be a MQTT broker that provides a pub/sub message store to buffer communications between the REST API and the edge message broker 820 of the aviation connectivity gateway module 800. Mavlink REST API 922 is available to external clients 930 allowing sending and receiving mavlink data to and from an aircraft. Video ingestion 924 receives, processes, buffers, and transcodes video streams before distribution to the clients 930 via video syndication 926. Video syndication 926 in turn distributes streaming video to the clients 930. Blob storage 916 receives and stores data files from the aviation connectivity gateway module 800 for later analysis. Data analytics 918 provides data processing, aggregation, and visualization of collected data files. Authorization and authentication 928 verifies identity of a client and authorizes access and actions for which the client has requisite privileges.

Turning to FIG. 11, a method of facilitating cellular connectivity in an aircraft will now be described. First, the aviation connectivity gateway module 800 may determine an Initial status of aircraft, as shown in block 1000. For example, the aviation connectivity gateway module 800 may determine that the aircraft is on the ground or is near ground level. Alternatively, the aviation connectivity gateway module 800 may determine the aircraft is below a threshold speed, within or below a predetermined airspace, or in a predetermined phase of flight such as takeoff and climb mode.

The aviation connectivity gateway module 800 may then initiate cellular connectivity via the first cellular connectivity element 804, as shown in block 1002. For example, the aviation connectivity gateway module 800 may establish a high-speed LTE cellular connection over the cellular network.

The aviation connectivity gateway module 800 may then transmit and receive data via the first cellular connectivity element 804, as shown in block 1004. For example, the aviation connectivity gateway module 800 may stream a video feed to the cloud service 906 and receive flight control commands for aircraft takeoff.

The aviation connectivity gateway module 800 may then determine an updated status of aircraft, as shown in block 1006. For example, the aviation connectivity gateway module 800 may determine the aircraft is above a threshold altitude. Alternatively, the aviation connectivity gateway module 800 may determine the aircraft is above a threshold speed, within or above a predetermined airspace, or within a pre-determined phase of flight such as cruise flight.

The aviation connectivity gateway module 800 may then initiate cellular connectivity via the second cellular connectivity element 806, as shown in block 1008. For example, the aviation connectivity gateway module 800 may establish an ALO LTE cellular connection over the cellular network.

The aviation connectivity gateway module 800 may then transmit and receive data via the second cellular connectivity element, as shown in block 1010. For example, the aviation connectivity gateway module 800 may continue streaming the video feed to the cloud service 906 and receiving flight control commands for controlling the aircraft.

The aviation connectivity gateway module 800 may then determine another updated status of aircraft, as shown in block 1012. For example, the aviation connectivity gateway module 800 may determine the aircraft is again below a threshold altitude. Alternatively, the aviation connectivity gateway module 800 may determine the aircraft is below a threshold speed or within, below a predetermined airspace, or within a pre-determined phase of flight such as descent and landing mode.

The aviation connectivity gateway module 800 may then re-initiate cellular connectivity via the first cellular connectivity element 804, as shown in block 1014. For example, the aviation connectivity gateway module 800 may re-establish a high-speed LTE cellular connection over the cellular network.

The aviation connectivity gateway module 800 may then transmit and receive data via the first cellular connectivity element 804, as shown in block 1016. For example, the aviation connectivity gateway module 800 may continue streaming a video feed to the cloud service 906 and receiving flight control commands for landing the aircraft.

The above-described aviation connectivity gateway module 800 provides several advantages. For example, the aviation connectivity gateway module 800 incorporates dual cellular components to ensure cellular connectivity near the ground and at altitude for complete aircraft control through the duration of the aircraft's flight, data upload and data offload, and data analytics (including for airborne cellular performance). The aviation connectivity gateway module 800 helps establish a BVLOS network up to, and in some embodiments above, 5,000 feet AGL.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fail within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as the processing system and control systems, may be implemented as special purpose or as general purpose devices. For example, the processing system may comprise dedicated circuitry or logic that is permanently configured, such as an application-specific integrated circuit (ASIC), or indefinitely configured, such as an FPGA, to perform certain operations. The processing system may also comprise programmable logic or circuitry (e.g., as encompassed within a general-purpose processor or other programmable processor) that is temporarily configured by software to perform certain operations. It will be appreciated that the decision to implement the processing system as special purpose, in dedicated and permanently configured circuitry, or as general purpose (e.g., configured by software) may be driven by cost and time considerations.

Accordingly, the terms "processing system" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing system is temporarily configured (e.g., programmed), each of the processing elements need not be configured or instantiated at any one instance in time. For example, where the processing system comprises a general-purpose processor configured using software, the general-purpose processor may be configured as respective different processing elements at different times, Software may accordingly configure the processing system to constitute a hardware configuration at one instance of lime and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or Instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, later, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing." "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims. For example, the principles of the present invention are not limited to the illustrated central pivot irrigation systems but may be implemented in any type of irrigation system Including linear move irrigation systems.

Having thus described various embodiments of the invention, what is claimed as new and desired to be protected by Letters Patent includes the following:

The invention claimed is:

1. An aviation connectivity gateway module for remotely offloading aircraft data from avionics of an aircraft, the avionics including a plurality of sensors, the aviation connectivity gateway module comprising:
    a processor configured to receive a remote wake-up command when the avionics are in a powered off state and the aircraft is not flying, the remote wake-up command indicating an invocation to wake up and power on the avionics to obtain sensor readings from the sensors; and a first communication element configured to communicatively couple the processor to the avionics when the processor receives the remote wake-up command;
a second communication element configured to communicatively couple the processor to a remote computing device; and
wherein the processor is further configured to:
power on the avionics when the processor receives the remote wake-up command;
obtain the aircraft data from the avionics when the avionics have been powered on; and
transmit the aircraft data to the remote computing device via the second communication element so as to remotely acquire aircraft data when the avionics are in the powered off state and the aircraft is not flying.

2. The aviation connectivity gateway module of claim 1, further comprising:
a memory configured to store the aircraft data obtained from the avionics.

3. The aviation connectivity gateway module of claim 2, wherein the processor is further configured to:
store the aircraft data on the memory when the avionics have been powered on, and
transmit the aircraft data from the memory to the remote computing device via the second communication element.

4. The aviation connectivity gateway module of claim 3, wherein the aviation connectivity gateway module only transmits the aircraft data when the aircraft is not flying.

5. The aviation connectivity gateway module of claim 3, wherein the aviation connectivity gateway module transmits the aircraft data in reverse order.

6. The aviation connectivity gateway module of claim 1, wherein the aviation connectivity gateway module is configured to operate in an airborne mode, a ground mode, a sleep mode, a deep sleep mode, and a pilot data request mode, the aviation connectivity gateway module being configured to switch from the deep sleep mode to the pilot data request mode when the processor receives the remote wake-up command.

7. The aviation connectivity gateway module of claim 1, wherein the remote wake-up command is in a Short Message Service (SMS) format.

8. The aviation connectivity gateway module of claim 1, wherein the processor is further configured to selectively power on avionics components.

9. The aviation connectivity gateway module of claim 1, wherein the aviation connectivity gateway module is configured to remotely install firmware and software updates to the avionics.

10. The aviation connectivity gateway module of claim 1, wherein the aviation connectivity gateway module is configured to generate aircraft data independently from the avionics.

11. A method of remotely offloading aircraft data from avionics of an aircraft, the method comprising the steps of:
receiving, via a processor of an aviation connectivity gateway module, a remote wake-up command when the avionics are in a powered off state and the aircraft is not flying, the remote wake-up command indicating an invocation to wake up and power on the avionics to obtain sensor readings from sensors of the aircraft; and
powering on the avionics when the processor receives the remote wake-up command and the avionics are in the powered off state;
obtaining the aircraft data from the avionics; and
transmitting the aircraft data to a remote computing device so as to remotely acquire aircraft data when the avionics are in a powered off state and the aircraft is not flying.

12. The method of claim 11, further comprising the steps of:
storing the aircraft data on a memory of the aviation connectivity gateway module; and
transmitting the aircraft data from the memory to a remote computing device.

13. The method of claim 12, wherein the step of transmitting the aircraft data is only performed when the aircraft is not flying.

14. The method of claim 12, wherein the step of transmitting the aircraft data includes transmitting the aircraft data in reverse order.

15. The method of claim 11, wherein each step is performed in one of an airborne mode, a ground mode, a sleep mode, a deep sleep mode, and a pilot data request mode.

16. The method of claim 11, wherein the remote wake-up command is in a Short Message Service (SMS) format.

17. The method of claim 11, wherein the step of powering on the avionics includes selectively powering on avionics components.

18. The method of claim 11, further comprising the step of remotely installing firmware and/or software updates to the avionics.

19. The method of claim 11, further comprising the step of generating aircraft data independently from the avionics.

* * * * *